Sept. 25, 1962    J. G. GILES    3,055,233
VARIABLE RATIO TRANSMISSION MECHANISM
Filed Dec. 8, 1959    2 Sheets-Sheet 1

Inventor
J. G. Giles
By Glascott Downing Diebold
Attys.

Sept. 25, 1962    J. G. GILES    3,055,233
VARIABLE RATIO TRANSMISSION MECHANISM
Filed Dec. 8, 1959    2 Sheets-Sheet 2

Inventor
J. G. Giles
By Mascot Dowing Seebold

United States Patent Office 3,055,233
Patented Sept. 25, 1962

3,055,233
VARIABLE RATIO TRANSMISSION MECHANISM
John George Giles, Nuneaton, England, assignor to The Motor Industry Research Association, Lindley, near Nuneaton, England
Filed Dec. 8, 1959, Ser. No. 858,177
Claims priority, application Great Britain Mar. 17, 1959
4 Claims. (Cl. 74—687)

This invention relates to variable ratio transmission mechanisms wherein power from an engine is transmitted to an output shaft which may be required to rotate at any speed within a working range of speeds of rotation whilst delivering power.

In particular, this invention is applicable to hydromechanical forms of variable transmission such as disclosed in my copending application, Serial No. 634,879, filed January 18, 1957, now Patent No. 2,924,123, dated February 9, 1960, in which a variable hydraulic drive is combined with mechanical gearing in such a manner that, for at least part of the normal operation, the input power is shared between the hydraulic drive and mechanical gearing. Transmissions which operate so that the total transmitted power is shared between two or more alternate paths of power flow are referred to as shunt or differential transmissions. In such transmissions a reversal of power flow sometimes occurs in one of the paths. It is an object of this invention to prevent this reversal of power flow taking place.

According to the present invention there is provided a variable ratio transmission mechanism embodying a fluid drive combined with mechanical gearing, power supplied to said mechanism being shared between the fluid drive and mechanical gearing, wherein a uni-directional clutch is provided in the path of the power transmitted by the fluid drive.

Preferably the arrangement of the uni-directional clutch is such that it prevents a reversal of power flow in the fluid drive and the components of the fluid drive being rotated in their normal sense by power flowing from the output shaft of the mechanism; and the arrangement is also such that the components of the fluid drive are driven by power flowing only from the input shaft and that the fluid drive can only be rotated in its normal direction by fluid medium.

Figure 1:
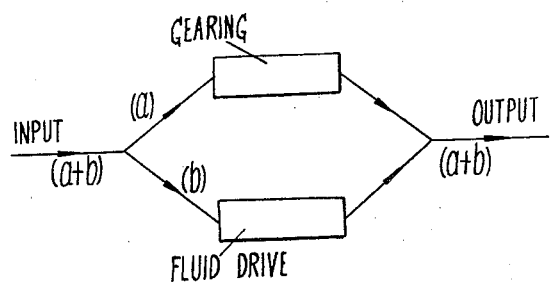
Figure 2:
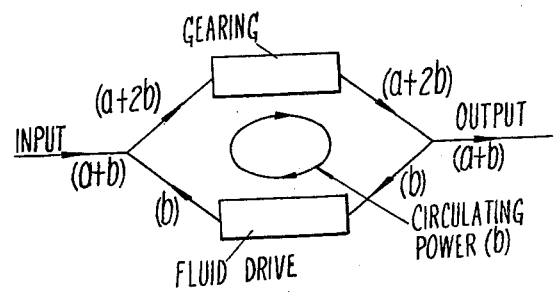
Figure 3:
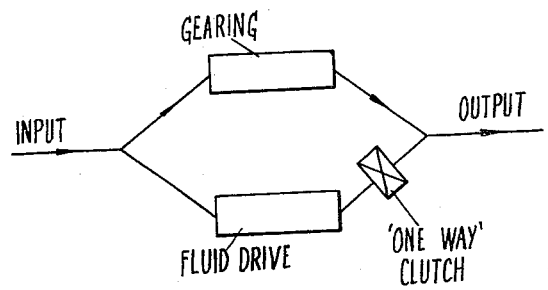
Figures 4, 5:
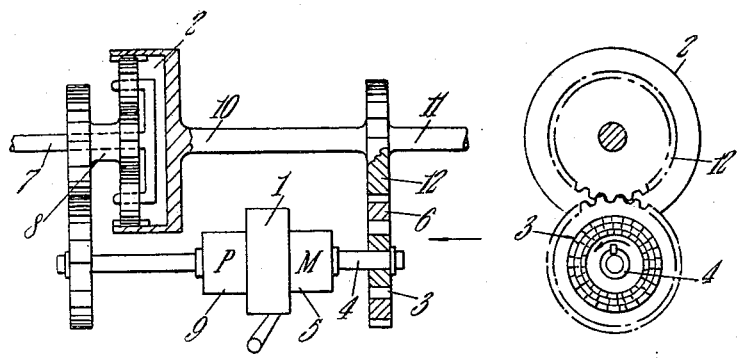
Figures 6, 7:
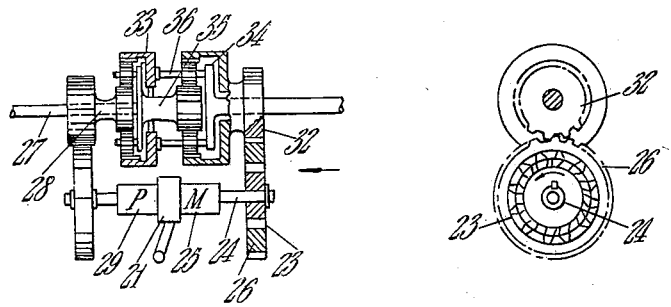

The invention will now be described with reference to the accompanying diagrammatic drawings in which:

FIGURE 1 diagrammatically illustrates a shunt transmission system,

FIGURE 2 illustrates a similar system to that illustrated in FIGURE 1, when the latter is in a "power circulating" condition, FIGURE 3 diagrammatically illustrates a shunt transmission system according to the present invention, FIGURE 4 shows a shunt transmission according to the present invention, FIGURE 5 is a side elevation of the transmission shown in FIGURE 4 taken in the direction of the arrow IV on that figure, FIGURE 6 shows a modified shunt transmission according to the present invention, FIGURE 7 is a side elevation of the transmission shown in FIGURE 6 taken in the direction of the arrow VI on that figure.

Figure 8:
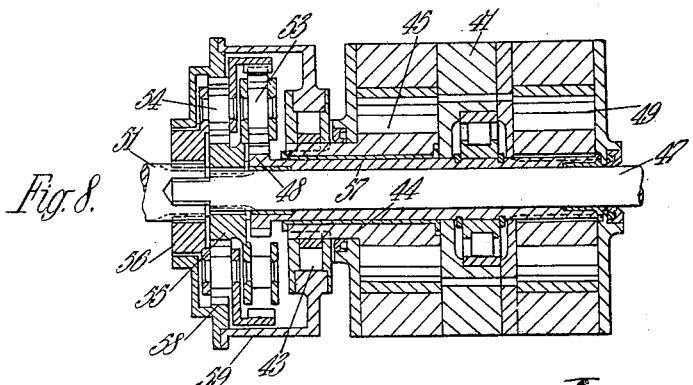

FIGURE 8 shows a further modified shunt transmission according to the present invention.

Referring firstly to FIGURES 1–3, FIGURE 1 illustrates a shunt transmission, the components of which are so arranged that power ($a + b$), flowing from an input shaft, is divided between two power transmitting devices, i.e. gearing and fluid drive, and is recombined at the output shaft. If the shunt transmission is operating outside the normal operating transmission ratios a reversal of power flow may occur. Such a condition may also occur, to a lesser extent, during normal operation on account of the losses in the hydraulic components. Power flowing in the reverse direction, i.e. from output to input, in any path of a shunt transmission is disadvantageous since it increases the power flow and, hence, losses in all other paths. According to the present invention in order to prevent this latter condition, as illustrated in FIGURE 3, a uni-directional clutch is inserted in the hydraulic drive of the shunt transmission.

One mode of carrying the present invention into effect will now be described, by way of example, with reference to FIGURES 4 and 5 of the drawings. As shown there is provided a shunt transmission in which a positive displacement type hydraulic drive 1 is combined with a single set of epicyclic gearing 2. A uni-directional clutch 3 is mounted between a shaft 4 driven by the hydraulic motor unit of the hydraulic drive 1 and the output drive gears 6 and 12 of the transmission. Power is supplied to the transmission through an input shaft 7 to the gearing 2 where a division takes place so that some power flows via the sun wheel 8 of the epicyclic gearing 2 and intermediate gearing to the input 9 of the hydraulic drive. The remainder of the input power is transmitted by gearing 2 and a shaft 10 which connects with the output shaft 11 of the transmission at the point where the hydraulic power joins the output shaft by way of the output gearing 6 and 12. The uni-directional clutch 3 is situated in one of the gears 6 and is arranged so that if, for example, the shaft 4 driven by the hydraulic motor unit normally rotates in an anticlockwise direction as shown in FIGURE 5, then the gear 6 will be driven in an anticlockwise direction. If the operating conditions change so that the shaft 4 rotates in a clockwise direction, then the gear 6 will not rotate because the clutch will react and cease to transmit power. Similarly, if the gear 6 rotates in a clockwise direction due to the rotation of the output shaft 11 and its associated gearing, then the action of the uni-directional clutch will disconnect the shaft 4 which will not rotate unless driven by the power transmitted by the hydraulic drive.

A further mode of carrying the present invention into effect will now be described with reference to FIGURES 6 and 7 of the drawings. The shunt transmission illustrated in FIGURE 8 is similar to that described in application No. 634,879, now Patent No. 2,924,123 dated Feb. 9, 1960. Power flows from an input shaft 27 to two sets of differential gearing 33 and 34 where it is divided between a mechanical path and a hydraulic path. The hydraulic path for power flow is constituted by a positive displacement drive 21 driven by gearing connected to the sun gear of the left-hand differential 33. The positive displacement drive delivers its output power to the right-hand differential 34 by means of gears 26 and 32. The sun gear 28 is connected by gearing to the hydraulic pump 29 and power developed in the hydraulic motor 25 drives gear 26 by means of its output shaft 24 and uni-directional clutch 23.

The mechanical path for power is constituted by a joint input member 35 and joint output member 36. The division of power from input is carried out by the left-hand differential gear 33 and the combining of the separate power flows is effected by the other differential 34 which connects the hydraulic and mechanical power flows to the output shaft.

As shown in FIGURE 7 the uni-directional clutch unit 23 is arranged so that if the hydraulic output shaft 24 rotates in its normal direction, then the drive gear 26 will be connected by the uni-directional clutch and will rotate with the shaft 24. The drive gear 26 may rotate in this normal direction at a faster (over-running) speed than the shaft 24 due to the normal operation of the uni-directional clutch mechanism. The arrangement of the uni-directional clutch is such that the shaft 24 cannot be rotated in the normal direction by means of the drive gear 26.

A yet further mode of carrying the present invention into effect will now be described with reference to FIGURE 8 of the accompanying drawings. Power flows to the transmission by means of an input shaft 47 which is situated co-axially with respect to a hydraulic drive 41 in such a manner as to be in engagement with two sets of epicyclic gearing 53 and 54.

The hydraulic pump 49 of the hydraulic drive 41 is driven by a hollow shaft 57 connected to the sun wheel 48 of the right-hand epicyclic gear set 53. The hydraulic motor 45 of the hydraulic drive 41 is connected to the left-hand epicyclic gear 54 by means of a third concentric hollow shaft 44 on which is mounted a uni-directional clutch 43 which, in turn, is connected to the annulus 58 of the left-hand epicyclic gear 54 by a hollow drum-shaped member 59. The uni-directional clutch is so arranged that the hydraulic motor shaft 44 may drive the annulus 58 in its normal direction, and that rotation of the annulus 58 in this normal direction can occur without similar rotation of the hydraulic motor 45 and the shaft 44.

Mechanical power is transmitted to the output shaft 51 of the transmission through the gearing by means of an input member 55 consisting of a sun gear combined with a planet carrier, and a common output member 56 which combines an annulus and a planet carrier and transmits the combined output to the output shaft 51.

It will be appreciated that in the foregoing arrangements the uni-directional clutch is arranged so that the hydraulic output may transmit power to an output shaft of a shunt transmission and also so that normal rotation of the output shaft does not drive the hydraulic output members.

The uni-directional clutch may be of any known kind, for example, the ratchet, rotor, ball or "sprag" type.

It will also be appreciated that the foregoing details are given by way of example only and that any desired modifications may be made to the invention, within the scope of the claims appended hereto, in order to satisfy varying requirements.

I claim:

1. A brakeless variable speed ratio transmission comprising an input shaft and a driven shaft, a planetary gear device including three rotary elements, one of said elements being driven by said input shaft, a second of said elements driving said driven shaft, a positive displacement hydraulic pump, said pump being driven by the third of said elements, a hydraulic motor driven by hydraulic fluid from said hydraulic pump, variable means to positively control the relative speeds of rotation between said hydraulic pump and said hydraulic motor, and gear means including an overrunning clutch drivingly connecting said hydraulic motor to said driven shaft.

2. Variable speed ratio transmission means including an input shaft to be driven by a motor or the like, and a driven shaft to drive a load, and comprising a planet-gear carrier secured to said input shaft, planet gears mounted on said carrier, a sun gear engaging said planet gears, a variable speed hydraulic pump driven by said sun gear to produce a variable flow of hydraulic fluid, a ring gear drivingly secured to said driven shaft and meshing with said planet gears, a variable speed hydraulic motor having a shaft, said hydraulic motor being positively driven by hydraulic fluid from said hydraulic pump, means to positively vary the speed ratio between said hydraulic pump and said hydraulic motor, and gear means including a one-way clutch device drivingly connecting the shaft of said hydraulic motor to said output shaft.

3. The variable speed ratio transmission means of claim 2 in which said gear means drivingly connecting the shaft of said hydraulic motor to said output shaft includes a second ring gear concentric with said driven shaft driven by said hydraulic motor, second planet gears meshing with said second ring gear, and a second sun gear fixed to said input shaft meshing with said second planet gears, said second planet gears being carried by spindles fixed to said driven shaft.

4. A variable speed ratio transmission comprising an input shaft, two complete planetary gear sets, each said gear set comprising a sun gear, a ring gear, a planet carrier, planet gears carried by said carrier and meshing both with the sun and ring gear of the corresponding gear set, said input shaft being fixed to the planet carrier of the first of said planetary gear sets and to the sun gear of the second said planetary gear set, said ring gear of said first set and said planet carrier of said second planetary gear set being fixed to said driven shaft, a positive displacement hydraulic pump said sun gear of said first planetary gear set being drivingly secured to said positive displacement hydraulic pump, a hydraulic motor driven by hydraulic fluid from said hydraulic pump, means to positively vary the speed ratio between said pump and said motor, and said hydraulic motor being drivingly secured to the ring gear of said second gear set, whereby, by varying the speed ratio between said pump and motor, the speed ratio between said input and said driven shaft is varied, and an over-running clutch means interposed between said hydraulic motor and said ring gear of said second gear.

References Cited in the file of this patent
UNITED STATES PATENTS
2,687,657    Kugel _____ Aug. 31, 1954
FOREIGN PATENTS
758,516    Great Britain _____ Oct. 3, 1956
OTHER REFERENCES
SAE Journal, February 1958, pages 27–30.